United States Patent [19]
Brown et al.

[11] Patent Number: 5,449,282
[45] Date of Patent: Sep. 12, 1995

[54] SELF-CENTERING MOLDING APPARATUS

[75] Inventors: Robert L. Brown, Hartville; David E. Baxter, Ravenna; Daniel L. Goodell, Tallmadge; Todd A. England, North Canton, all of Ohio

[73] Assignee: GenCorp Inc., Fairlawn, Ohio

[21] Appl. No.: 146,846

[22] Filed: Nov. 1, 1993

Related U.S. Application Data

[60] Continuation-in-part of Ser. No. 49,041, Apr. 16, 1993, Pat. No. 5,318,435, which is a division of Ser. No. 774,448, Oct. 10, 1991, Pat. No. 5,209,889.

[51] Int. Cl.⁶ .............................................. B29C 45/04
[52] U.S. Cl. ................... 425/190; 425/192 R; 425/574; 425/575; 425/577
[58] Field of Search ............. 425/190, 574, 575, 577, 425/192 R

[56] References Cited

U.S. PATENT DOCUMENTS 4,556,377 12/1985 Brown .................................. 425/575
4,889,480 12/1989 Nakamura et al. .................. 425/577

*Primary Examiner*—Tim Heitbrink
*Attorney, Agent, or Firm*—Robert F. Rywalski; Jeanne E. Longmuir

[57] ABSTRACT

A self-centering molding apparatus 10 for forming molded products including a first mold portion 14 and a second mold portion 15 together forming a mold cavity 16 for receiving molding material forming the molded product M. The first mold portion 14 has an alignment member 18 in fluid communication with the mold cavity 16 and for alignment and engagement with an injection press P for injecting molding material into the apparatus 10. The first mold portion 14 is adapted for self-centering, mating engagement with the second mold portion 15. The second mold portion 15 has a multi-section mold assembly 22, a support plate 24 and an operating assembly 26. The multi-section mold assembly 22 is adapted for self-centering, mating engagement with the first mold portion 14 and the operating assembly 26, and is supported on and engaged with the support plate 24 for opening and closing the multi-section mold assembly for accessing a molded product M supported within the mold cavity 16. The support plate 24 is engaged with the operating assembly 26 and movable with respect to the second mold portion 15 to open the multi-section mold assembly 22 for accessing the molded product M within the mold cavity 16.

13 Claims, 9 Drawing Sheets

MATCH TO FIG. 1B

MATCH TO FIG. 1B
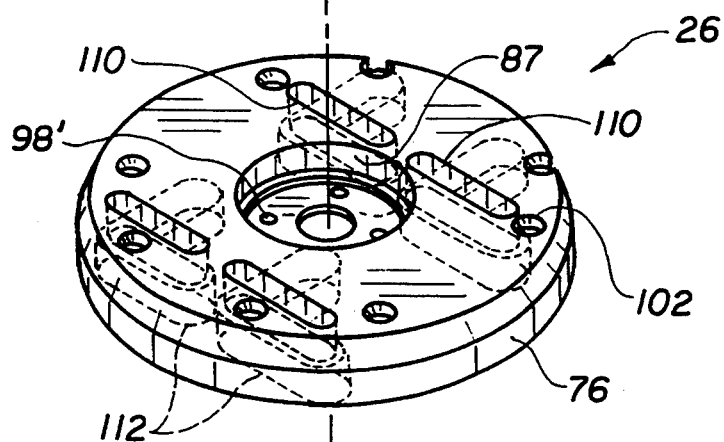
FIG. 1C
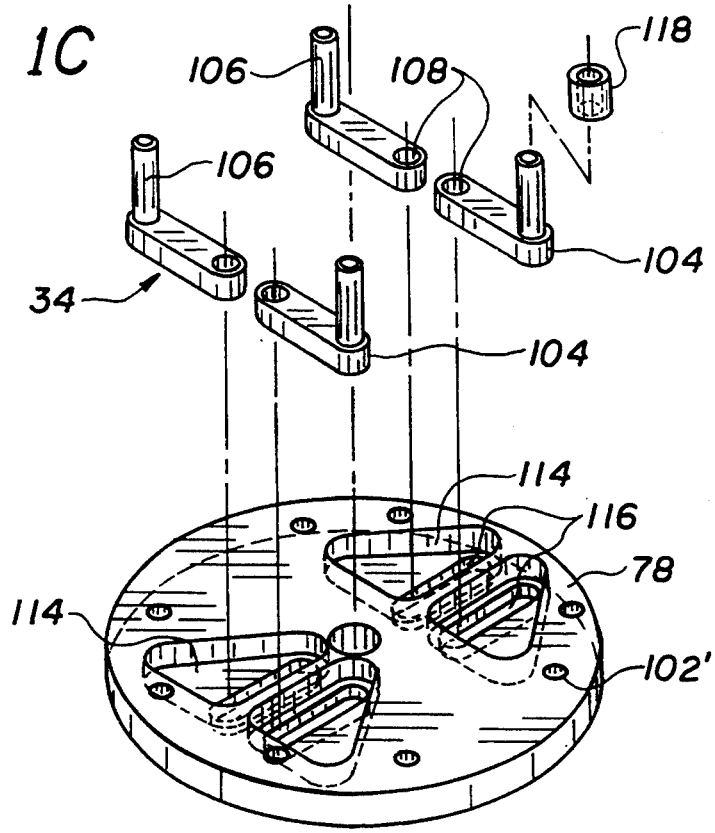
MATCH TO FIG. 1D

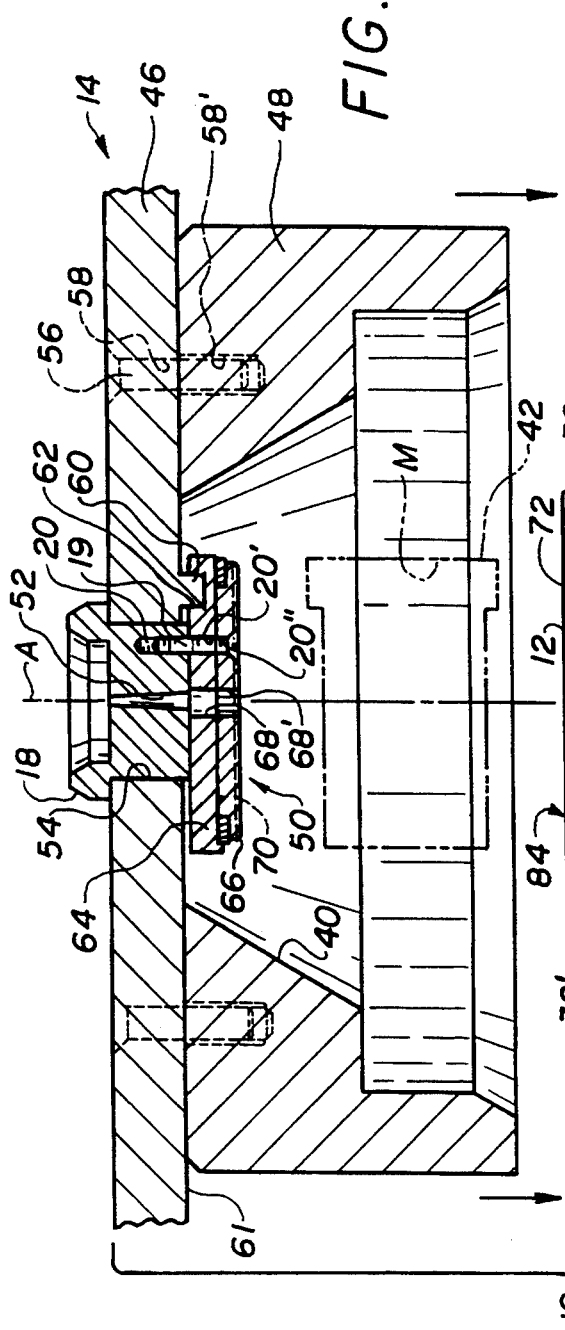
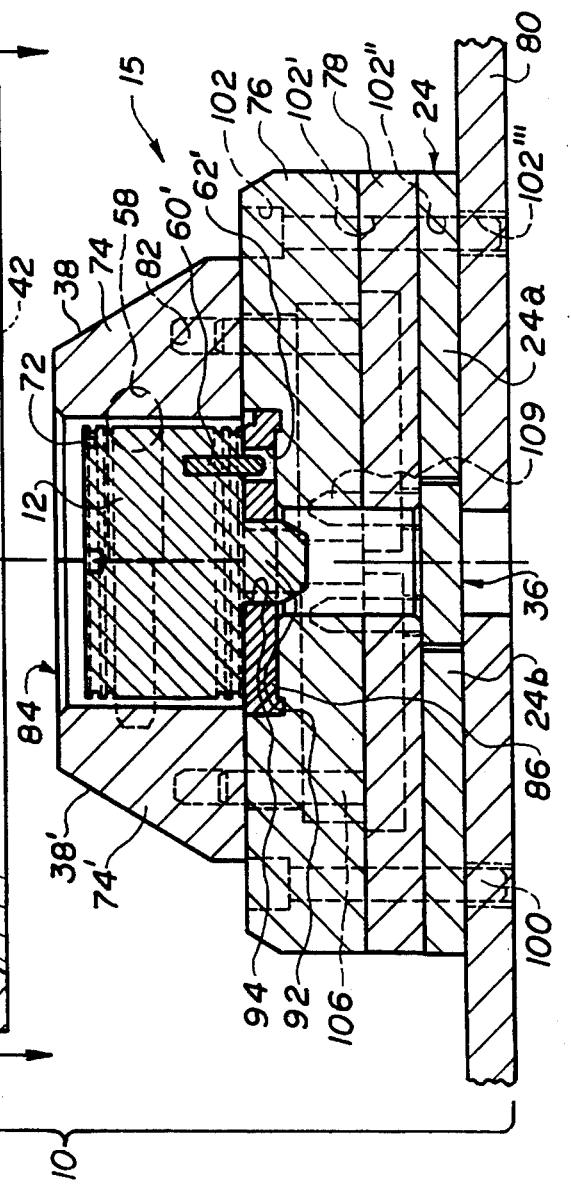
FIG. 2A
FIG. 2B

SELF-CENTERING MOLDING APPARATUS

This is a continuation-in-part application of U.S. application Ser. No. 08/049,041, filed Apr. 16, 1993, now U.S. Pat. No. 5,318,435 which is a division of No. 07/884,448 filed Oct. 10, 1991 now U.S. Pat. No. 5,209,889.

TECHNICAL FIELD

The present invention relates to a self-centering molding apparatus for molding objects in an injection molding machine.

BACKGROUND OF THE INVENTION

The components of an injection molding machine typically include a stock supply assembly, an extruder assembly, an injection assembly, a mold assembly and a clamping assembly. In a typical molding process, the stock supply assembly supplies a certain amount of stock material to the extruder assembly. The extruder assembly plasticizes the stock material into injection material and conveys the desired amount of injection material to the injection assembly. Upon clamping of the mold assembly within the clamping assembly under the force necessary for successful molding, the injection assembly injects the injection material into a mold cavity within the mold assembly.

The mold assembly is usually formed by two selectively joinable/separable mold portions. When an insert molding procedure is used in an injection molding machine, the mold portions are initially separated and an unfinished insert is loaded into one of the mold portions. The mold portions are then joined together to form the mold cavity which may surround the insert. Once the mold cavity is formed, the mold assembly is clamped under the necessary force to hold the mold portions together during operation of the injection assembly, which injects the molding material into the mold cavity. One portion of the mold assembly is then removed and the molded product, including the insert, is unloaded from the mold cavity.

In such molding procedures, the injection molding machine is idle for significant periods of time because once the molding process is completed, the next molding operation cannot begin until unloading/loading steps are performed. Further, additional procedures may also be required in insert molding procedures to modify any disfigurement or misalignment in the inserts provided to the mold cavity. Such inserts are often bent during transport and are not provided to the mold cavity in an ideal condition for molding. In the event such inserts are sufficiently out of alignment, additional procedures may be required to rework or realign the inserts before molding. Additionally, the use of insert molding procedures typically require full opening of the mold portions to provide easy access for molded product removal and mold cleaning.

SUMMARY OF THE INVENTION

The present invention provides a new and improved self-centering molding apparatus which eliminates substantial periods of machine idleness, accommodates the use of cylindrical molding inserts which may be out of alignment, and provides a molding apparatus enabling easy access for product removal and mold cleaning. This is accomplished by the use of the self-centering molding apparatus in a shuttle assembly. The self-centering molding apparatus allows the molding process to be performed using inserts which are not perfectly aligned. Additionally, the self-centering molding apparatus permits the unloading/loading steps to be efficiently and easily performed by an operator of the injection molding machine, and reduces the amount of scrap resulting from the injection process.

More particularly, the present invention provides a self-centering molding apparatus for an injection molding machine. The molding apparatus includes a mold core, and first and second mold portions together forming a mold cavity for receiving molding material forming a molded product. A mold core is provided in the apparatus, since the molded product preferably includes a cylindrical metal mold insert which is provided with molding material on an inside surface. However, it should be understood that the apparatus may be used to mold a variety of molded products.

The first mold portion has an alignment member in fluid communication with the mold cavity for alignment and engagement with the injection assembly for injecting molding material into the molding apparatus. The first mold portion is adapted for self-centering, mating engagement with the second mold portion. The second mold portion has a multi-section mold assembly, a support plate and an operating assembly. The multi-section mold assembly being adapted for self-centering, mating engagement with the first mold portion, and the operating assembly supported on and engaged with the support plate for opening and closing the multi-section mold assembly to access the mold core and molded product supported within the mold cavity. The support plate forms a part of the operating assembly, which is movable with respect to the second mold portion to open and close the multi-section mold assembly for insertion of a mold insert and removal of the mold core portion and molded product from the mold cavity.

The operating assembly is a linkage mechanism which operates within the multi-section mold assembly of the second mold portion to open and close the multi-section mold assembly. During operation, the self-centering molding apparatus is shuttled to a position for loading/unloading of the mold insert, and the multi-section mold assembly is opened to a position for receiving the mold inserts using the linkage mechanism. Thereafter, the multi-section mold assembly is closed using the linkage mechanism, and the closed mold assembly is shuttled to a position for clamping within the clamping assembly and for engagement by the injection assembly. Following injection of the injection material, the self-centering molding apparatus is shuttled to an unloading-/loading position, and the multi-section mold assembly is moved via the linkage mechanism to an open position. In the open position at the unloading/loading position, the mold core, molded product and integral mold insert are readily removed from the mold cavity.

A control system is also provided for automatically and manually controlling operation of the injection molding machine, including the self-centering mold apparatus and the shuttle assembly, supply assembly, extruder assembly, clamping assembly and injection assembly.

Other features and advantages of the self-centering molding apparatus will become apparent from the following detailed description of the preferred embodiments made with reference to the accompanying drawings, which form a part of the specification.

BRIEF DESCRIPTION OF THE DRAWINGS

FIGS. 1A-1D are schematic, exploded views of the components of a self-centering molding apparatus constructed in accordance with the present invention;

FIG. 2A-2B are cross-sectional, cut-away views of the first and second mold portions of the self-centering molding apparatus constructed in accordance with the present invention;

DETAILED DESCRIPTION OF THE PREFERRED EMBODIMENT

Figure 8:
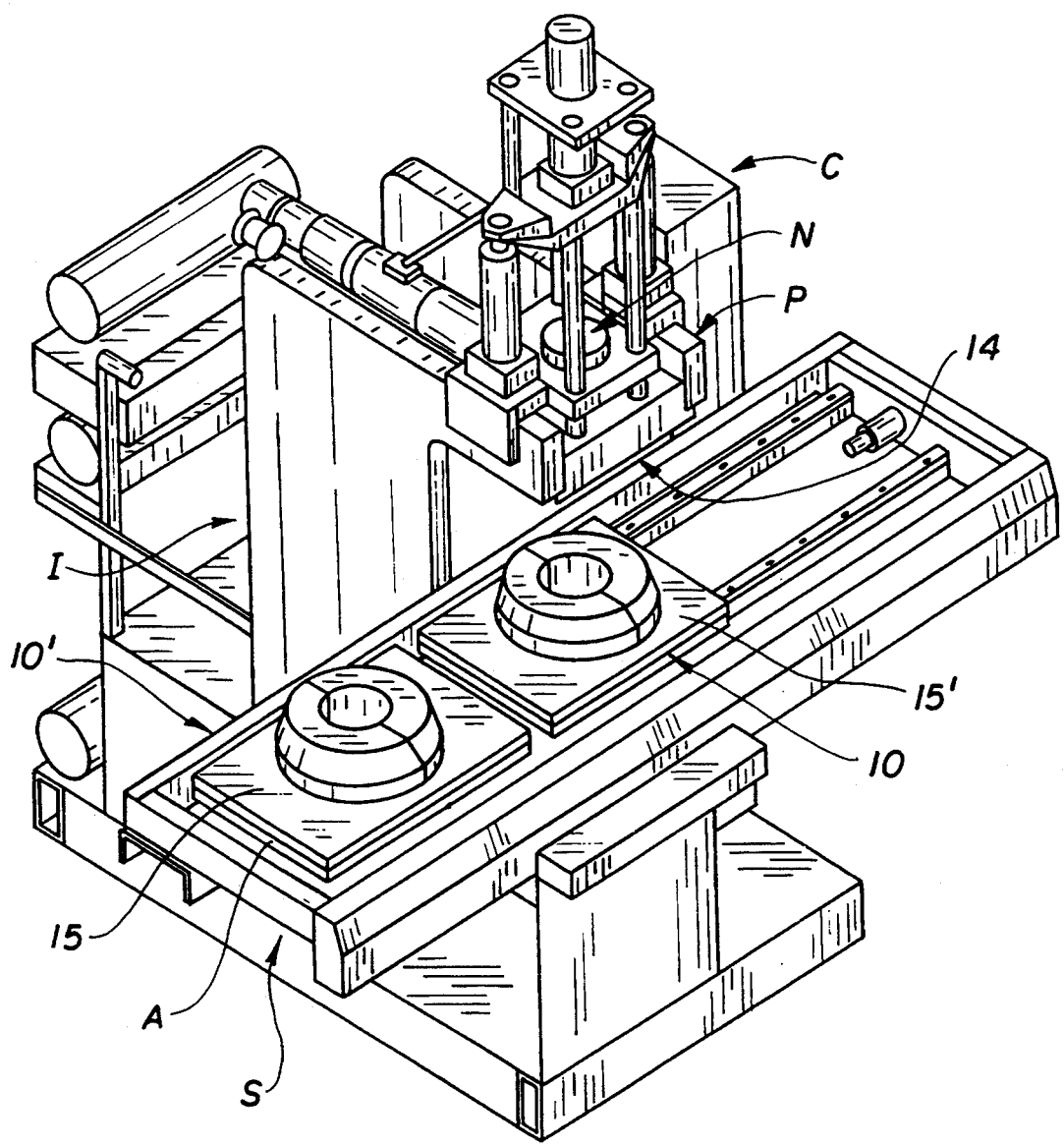
FIG. 8 is a schematic, perspective view of an injection molding machine including a shuttle assembly and the self-centering molding apparatus in accordance with the present invention.

FIGS. 1A-1D illustrate an improved self-centering molding apparatus. The self-centering molding apparatus, generally referred to at reference numeral 10 in FIGS. 2A-2B, preferably includes a mold core 12 and first and second mold portions 14, 15, together forming a mold cavity 16 for receiving molding material to form a molded product M. As shown in FIG. 8, the molding apparatus is used in connection with an injection molding machine having a shuttle assembly which allows the unloading/loading steps to be performed on one movable mold platen unit, while another movable mold platen unit is used in the molding operation. An injection molding machine having a shuttle assembly of the type illustrated is disclosed in co-pending application Ser. No. 08/049,041, filed Apr. 16, 1993, and in related U.S. Pat. No. 5,209,889, issued May 11, 1993, which are incorporated herein by reference.

The first mold portion 14 of the self-centering molding apparatus 10, includes an alignment member or bushing 18 engaged with a runner assembly 50, a top mold plate 46, and a receiving plate 48. The alignment member 18 is for engagement with a nozzle N of the injection press P, and enables alignment of the self-centering molding apparatus with the injection press for receiving molding material from the nozzle to a sprue opening 52, the runner assembly 50 and to the mold cavity 16. The alignment member 18 is free-floating within a center opening 54 of the top mold plate 46 to enable such alignment.

The top mold plate 46 is a rectangular plate having the center opening 54 for receiving the alignment member 18. The receiving plate 48 is engaged with and secured to the top mold plate 46 via conventional fasteners 56 secured within fastener openings 58, 58' within the top mold plate and receiving plate, respectively. An alignment pin 60 is provided on a surface 61 of the top mold plate which engages the receiving plate 48. The alignment pin 60 is provided for engagement within an alignment opening 62 in the runner assembly 50 for properly positioning the top mold plate and the receiving plate. The alignment of the alignment member 18 with the top mold plate 46, as illustrated in the best mode of the apparatus in FIG. 2A, is necessary due to the occasional non-symmetric configuration of the mold insert 42. Where the mold insert is symmetric, or of some alternate configuration, alignment of the alignment member and runner assembly may not be necessary.

The receiving plate 48 has an external cylindrical configuration, and an internal conical configuration with a tapered mating surface 40 which engages the second mold portion 15.

The runner assembly 50 includes an end plate 64, a Teflon polytetrafluoroethylene gasket insert 65 and a runner plate 66, and is secured in engagement with the alignment member 18 via conventional fasteners 19 engaged in fastener openings 20, 20' 20" in the alignment member and runner assembly components, respectively. In an alternate embodiment, the runner assembly may comprise only a runner plate, or other configurations and combinations of the runner assembly components. As shown in FIG. 2A, the end plate 64 and runner plate 66 each include a center sprue opening 68, 68'. The center sprue openings 68, 68' have a longitudinal central axis A which is also a longitudinal central axis of the sprue opening 52, and of the self-centering molding apparatus 10. The runner assembly 50 is secured to the surface 61 of the top mold plate 46 which engages the receiving plate 48 by a conventional fastener 56 secured within a fastener opening 58 in the alignment member 18.

Figure 7:
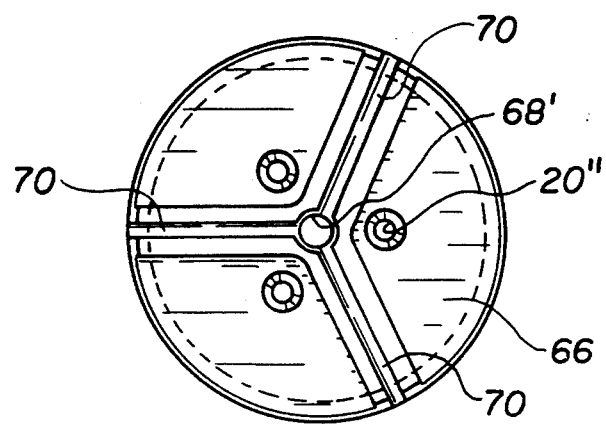
FIG. 7 is a bottom view of a runner plate of the self-centering molding apparatus constructed in accordance with the present invention taken along the line 7—7 of FIG. 1B.

The runner plate 66 includes runners 70, which as illustrated in FIG. 7 are positioned at 120 degree angles with respect to one another. The runners 70 are provided with molding material via the sprue opening 52, and center sprue openings 68, 68'. Core grooves 72 are formed in the mold core, and are also positioned at 120 degree angles with respect to one another and aligned with the runners 70. In the illustrated embodiment, the core grooves 72, together with the runners 70, form part of a molding material pathway to the mold cavity 16. As shown in the illustrated embodiment, the best mode of the apparatus provides cut-outs C, C' in one edge portion of the runner assembly 50 to accommodate a portion of the mold insert 16 engaged with the runner assembly. In the event the insert 42 was of a different configuration, it is understood that an alternate configuration mold insert could be provided to assist with formation of the mold cavity 16.

Figure 1A:
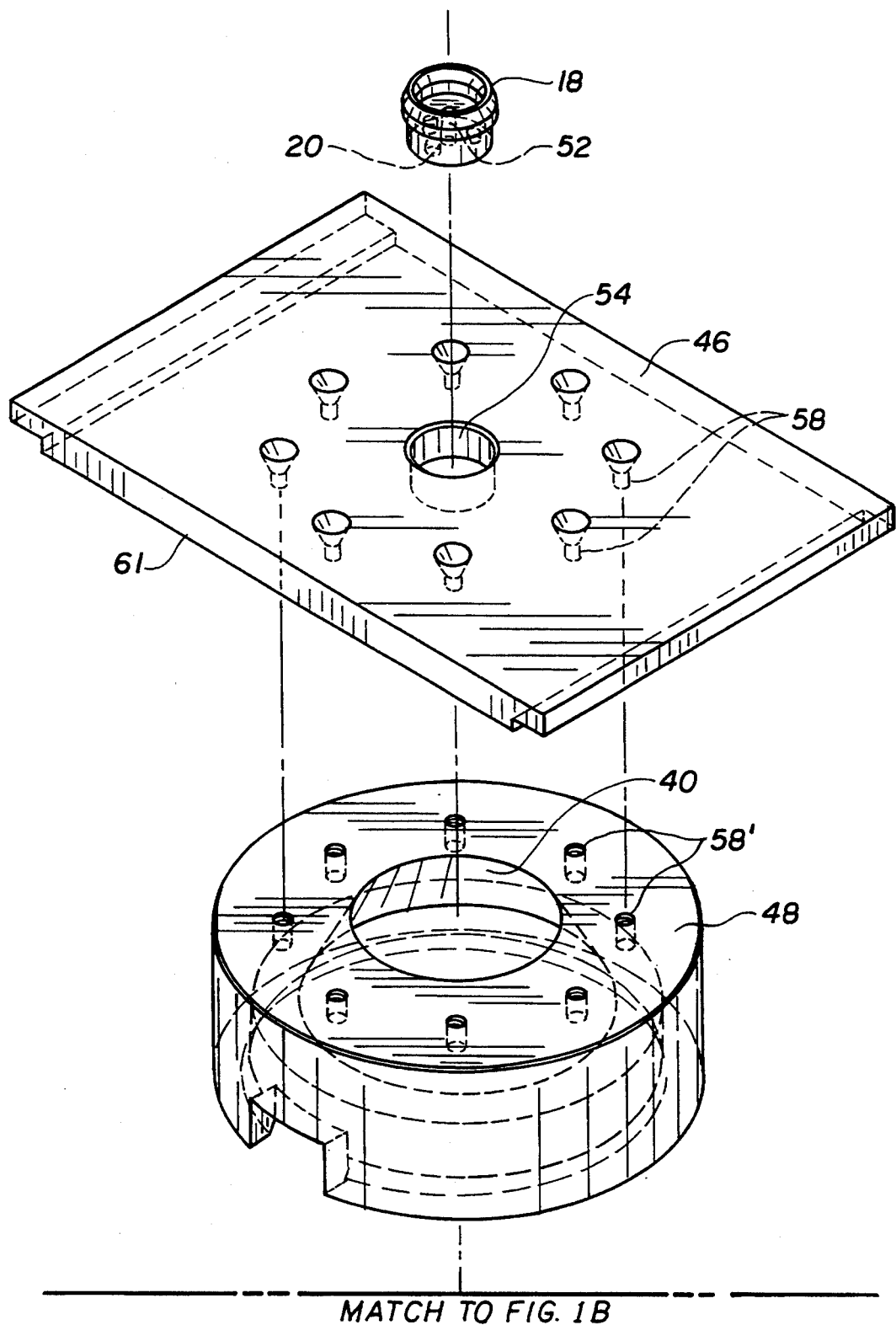
Figure 1B:
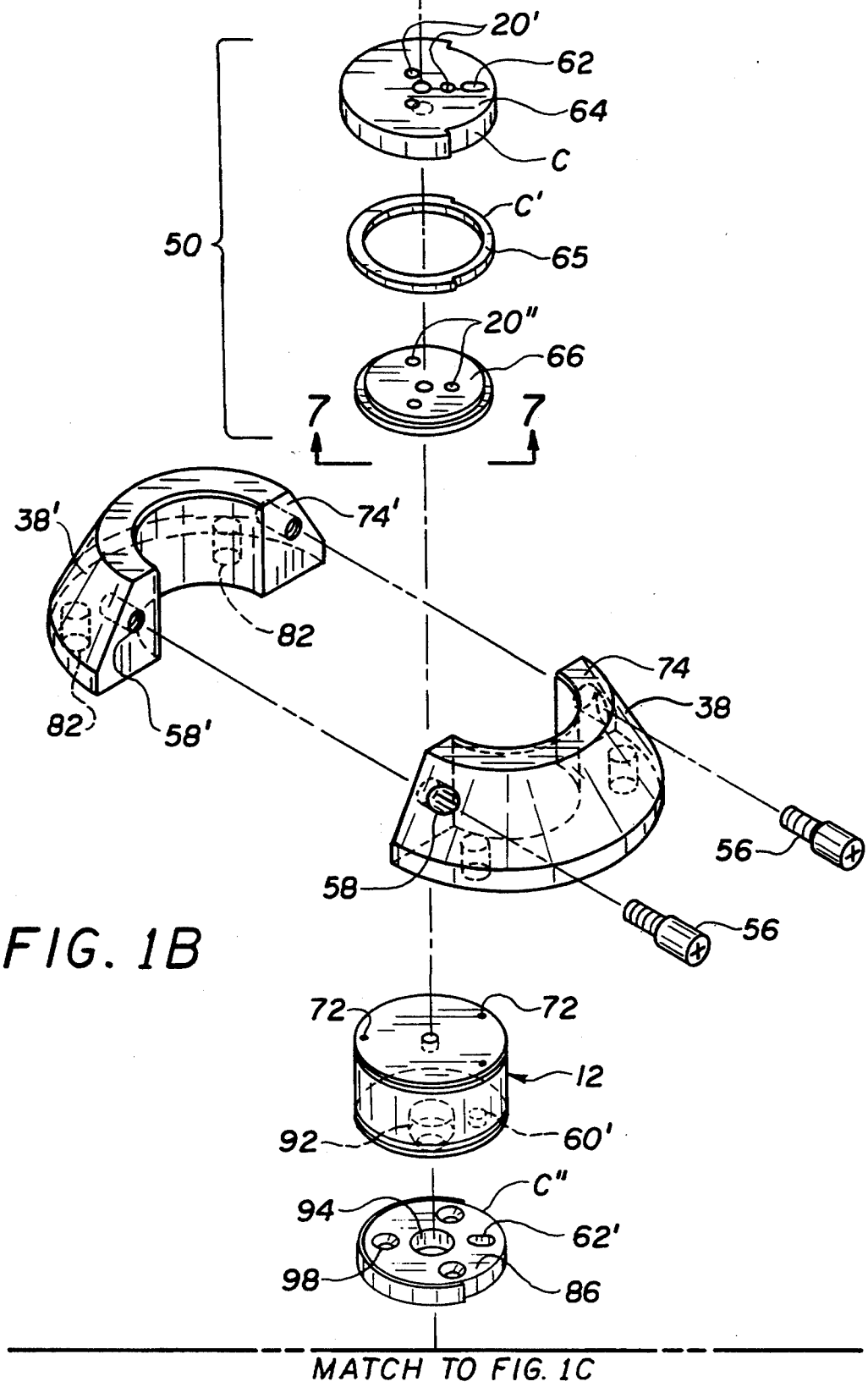

The mold core 12, illustrated in FIGS. 1B and 2B, comprises a metal core which forms a portion of the mold cavity 16. The mold core 12 includes an external molding surface 90 having the desired configuration of the molded product. In the illustrated mold core external molding surface 90, grooves are provided to form integral O-ring seals in the molded product, which in the illustrated example is a layer of molding material on the internal surface of the mold insert 42. The mold core 12 includes an alignment pin 60' which is provided for engagement within an alignment opening 62' in a lower insert 86 for properly positioning the mold core and the lower insert. A central pin 92 is also provided on the mold core for engagement within a central opening 94 in the lower insert 86. The central pin 92 and central opening 94 are both positioned with their center axes in alignment along the longitudinal central axis A of the self centering molding apparatus.

The second mold portion 15 includes the multi-section mold assembly 22, the support plate 24, operating assembly 26 and bottom mold plate 80. The multi-section mold assembly comprises a split ring molding plate 74, 74', first and second operating plates 76, 78 interconnected with the operating assembly 26, an operating member 36 and the support plate 24.

Figure 3:
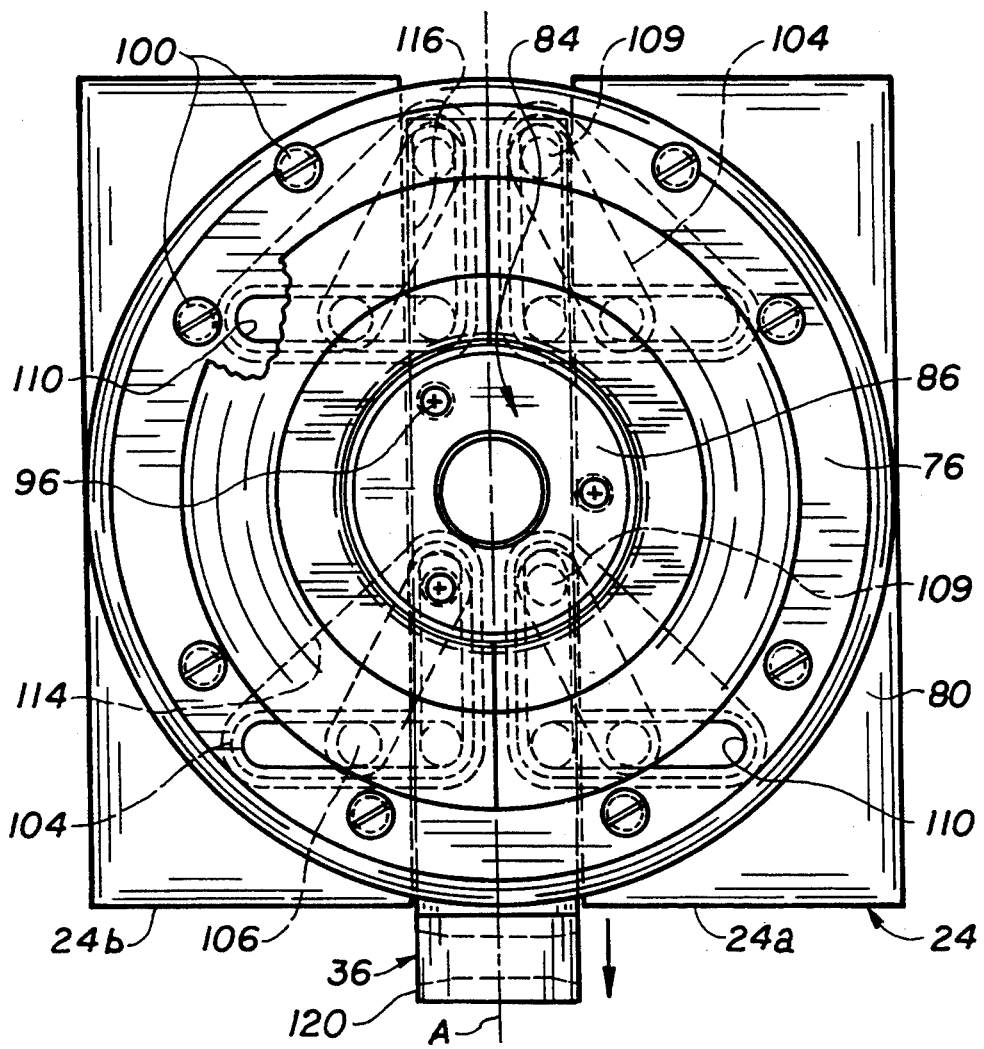
FIG. 3 is a top view, partially cut-away, of the second mold section of the self-centering molding apparatus constructed in accordance with the present invention, and shown in the closed position.
Figure 5:
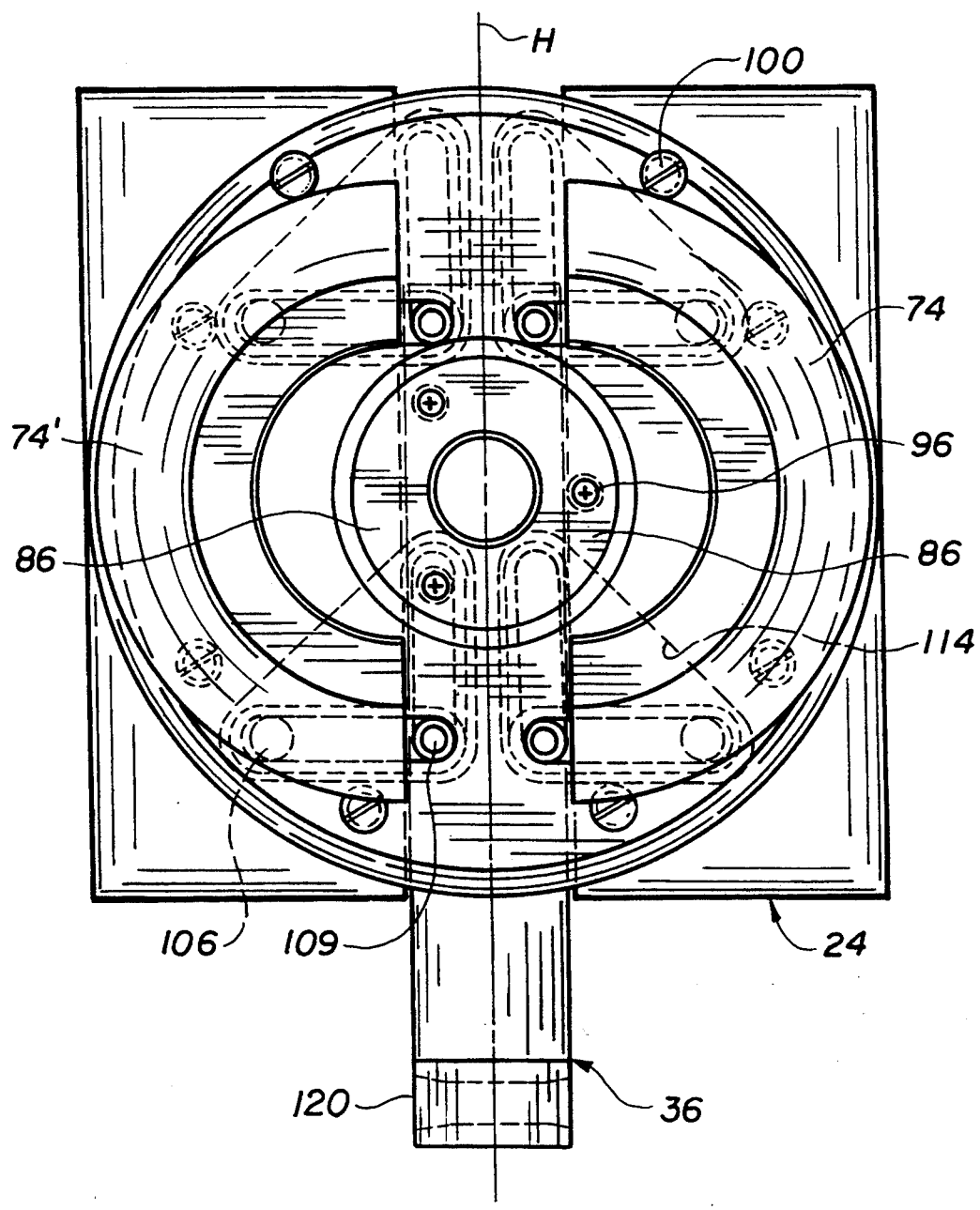
FIG. 5 is a top view, partially cut-away, of the second mold section of the self-centering molding apparatus constructed in accordance with the present invention, and shown in the open position.

The split ring molding plate 74, 74' comprises two semi-circular plates, shown in an open position in FIG. 5, and in a closed position forming a circle in FIG. 3. The split ring molding plates are engaged along, and form a mirror image relationship with respect to, a horizontal central axis H. A cylindrical internal chamber 84 is provided within the closed split ring molding plate for receiving the mold core 12. Each of the split ring molding plates includes a tapered top section 38, 38' for engagement with the tapered mold surface 40 of the first mold portion 14, and a pair of pin openings 82 for engagement with the linkage mechanism 34 of the operating assembly 26 to open and close the split ring plates. The tapered top section 38, 38' of the split ring molding plate 74, 74' engages the tapered mating surface 40 of the first mold portion 14 to self-center the first and second mold portions. Additionally, fastener openings 58, 58' are also provided in each of the split ring molding plates for securing the plates together by conventional fasteners 56.

The additional plates of the operating assembly 26 are stacked under the split ring molding plate as illustrated in FIG. 2B as follows: the first operating plate 76, the second operating plate 78, the support plate 24 and associated operating member 36, and the bottom mold plate 80. As illustrated, the support plate 24 comprises two components designated as support plate 24a and 24b, which are secured on either side of the slidable operating member 36. The plates of the operating assembly 26 are secured together in this stacked orientation via a plurality of conventional fasteners 100 engaged with mating fastener openings 102, 102', 102'', 102''' in the first operating plate 76, second operating plate 78, support plate 24 and bottom plate 80, respectively.

The lower insert 86 is also secured within a recess 87 formed in the first operating plate 76 for alignment with and support of the mold core 12 within the internal chamber 84 formed by the first operating plate 76 and split ring molding plate. The lower insert 86 is engaged and secured within the recess 87 via conventional fasteners 96 engaged within fastener openings 98, 98' in the lower insert 86 and first operating plate 76, respectively. A cut-out C'' is also provided in the lower insert 86 to enable engagement of the mold insert 42 illustrated in FIGS. 2A and 4 within the internal chamber 84.

Figure 4:
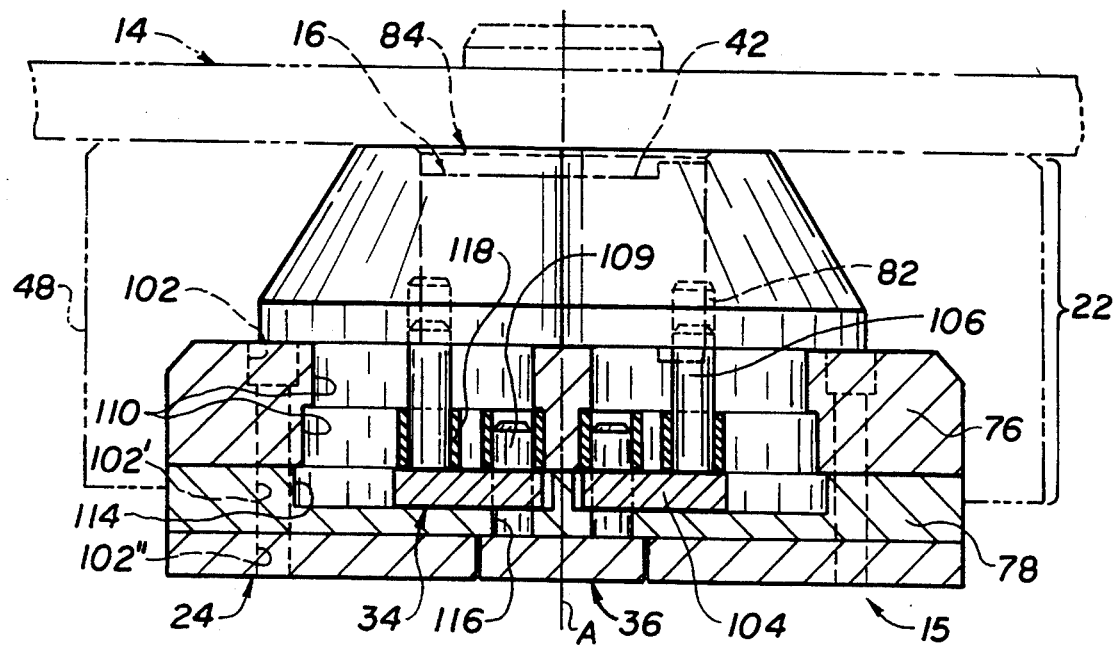
FIG. 4 is a cross-sectional side view of the second mold section, shown in the closed position, and taken along the line 4—4 of FIG. 3.
Figure 6:
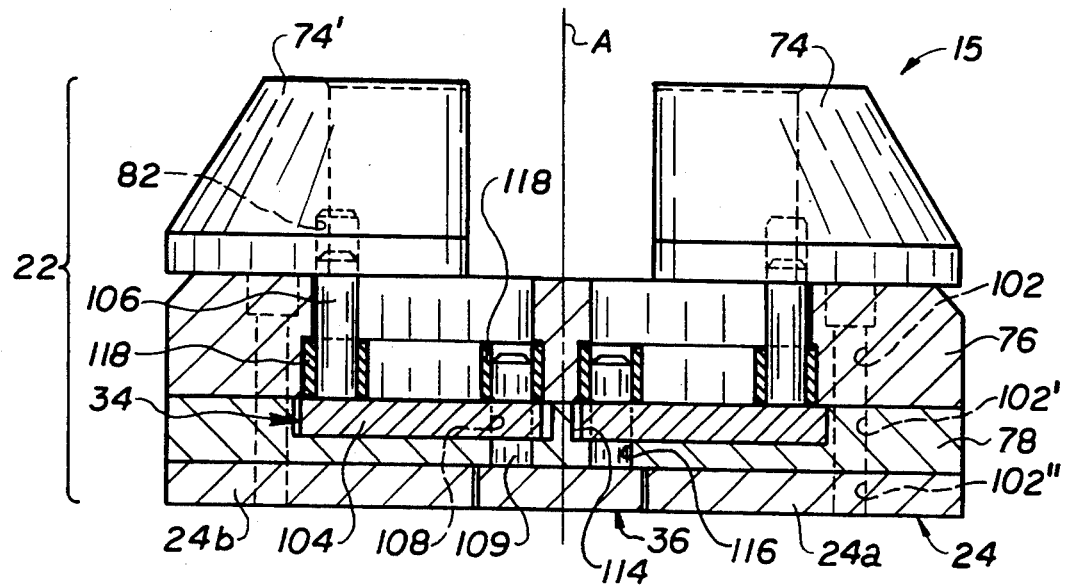
FIG. 6 is a cross-sectional side view of the second mold section, shown in the open position, and taken along the line 6—6 of FIG. 5.

As shown in FIGS. 2B, 4 and 6, the operating member 36 forms a portion of the support plate 24, and is engaged with the linkage mechanism 34 of the operating assembly 26 to open and close the split ring molding plates for easily accessing the mold core 12 for loading, unloading or cleaning. The linkage mechanism 34 of the operating assembly 26 operates within grooves formed in the first and second operating plates 76, 78, to move the split ring mold plates 74, 74' between the closed position illustrated in FIGS. 3 and 4, and the open position illustrated in FIGS. 5 and 6.

As shown in FIG. 1C, the first operating plate 76 includes two pairs of passage grooves 110 and two pairs of bottom grooves 112. One of each of the pairs of passage grooves and one of each of the pairs of bottom grooves are arranged in an L-shaped configuration, such that each of the passage and bottom grooves 110, 112 form a leg of the L-shape. The passage grooves 110 extend through the first operating plate 76, and are in communication with an associated bottom groove 112 at the interconnection between the legs. As illustrated, the mirror image arrangement of the passage and bottom grooves along the horizontal central axis H, results in four L-shaped groove configurations in the first operating plate 76.

Figure 1D:
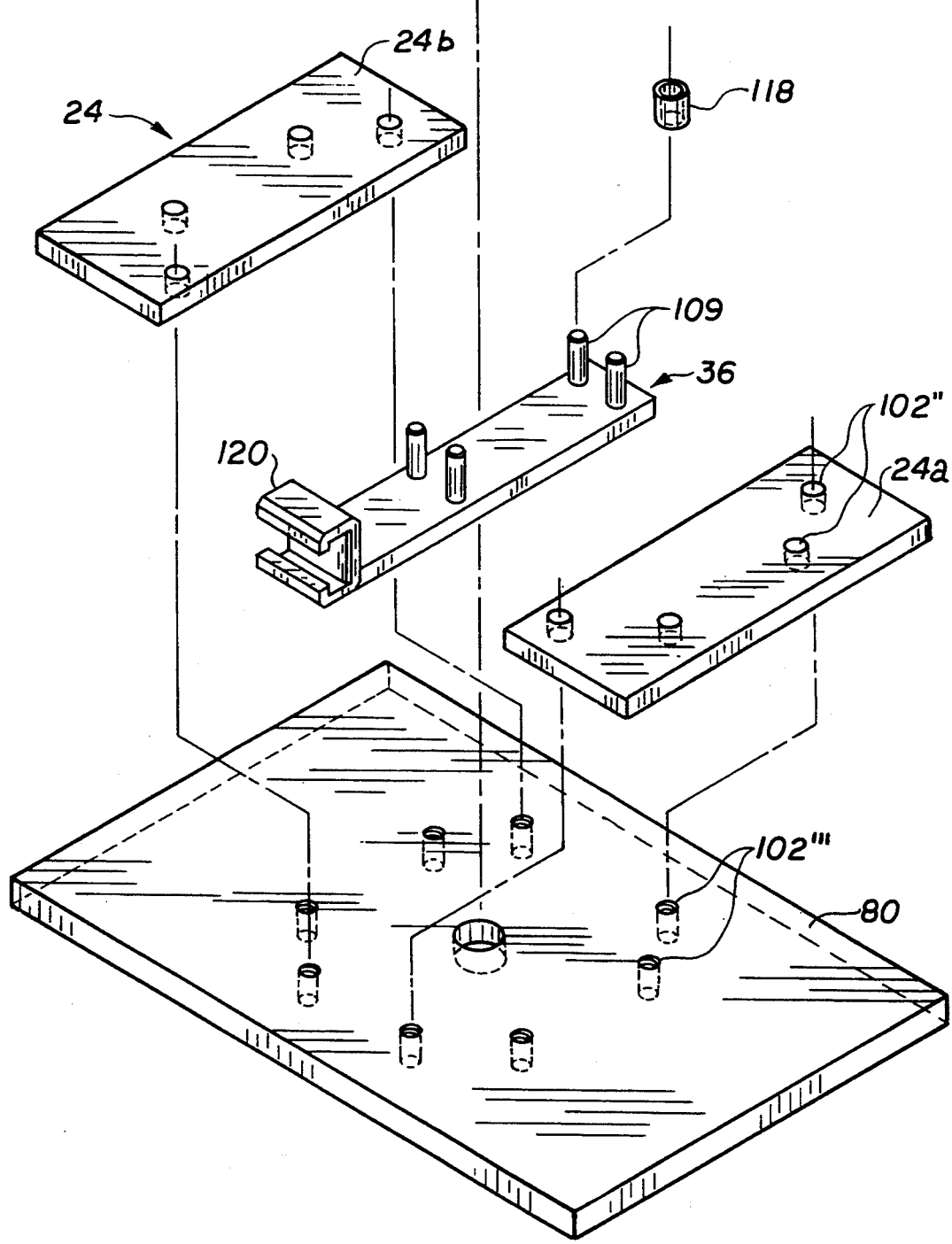

The second operating plate 78 includes four triangular recesses 114 and four bottom grooves 116. The bottom grooves 116 extend through the second operating plate 78. As shown in FIGS. 1D and 3, each of the recesses 114 is aligned with respect to one of the four passage grooves 110 and bottom grooves 112 forming L-shaped configurations in the first operating plate 76. Additionally, the bottom grooves 116 of the second operating plate 78 are aligned under the bottom grooves 112 of the first operating plate 76.

The linkage mechanism 34 comprises a pair of links 104 having link pins 106 on one end of each link for engagement with the corresponding pair of pin openings 82 in each of the split ring molding plates 74, 74'. The opposite end of each link 104 includes an operating opening 108 for engagement with the operating member 36. The links 104 are seated for horizontal movement within the triangular recesses 114 of the second operating plate 78. The link pins 106 are each engaged through the passage grooves 110 of the first operating plate 76 into friction fit engagement with the pin openings in the split ring molding plates 74, 74'.

As illustrated in FIGS. 1D, 4 and 6, the operating member 36 includes four operating pins 109 positioned for engagement through the bottom grooves 116 of the second operating plate 78, and engaged within the operating openings 108 of the links 104. Additionally, bearing members 118 are provided on each of the operating pins 109 and link pins 106 to provide a bearing surface between the pins and the passage groove 110 with which they are engaged. A C-shaped handle 120 is also provided on the operating member 36 for manual engagement by an operator, or for automatic engagement with another operating assembly. Movement of the direction of the arrows shown in FIG. 3 moves the apparatus, via the linkage mechanism, to the open position shown in FIG. 5.

During operation of the present apparatus, the self-centering molding apparatus may be provided to a mold pallet assembly A of an injection assembly or press I. In the embodiment illustrated in FIG. 8, a second apparatus 10' is provided to a second mold pallet assembly, so that loading, unloading and cleaning of one apparatus can be accomplished at a loading/unloading station on one mold pallet assembly spaced from the nozzle N, while the injection operation is being performed on a second mold pallet assembly at an injection station adjacent the nozzle N. To load the illustrated embodiment of the apparatus, the mold core 12 is provided to the internal chamber 84 within the second mold portion 15. Were desired, a mold insert 42 may also be provided into the chamber 84 adjacent the mold core 12. Once the necessary inserts and core are provided to the second mold portion, and any necessary coating or heating operations are performed, for example, the mold core may be preheated and/or coated to obtain a desired cure or molded part removal advantage, the first mold portion is then engaged with the second mold portion.

Engagement of the first and second mold portions may be accomplished either by providing the first mold portion 14 to the second mold portion 15 at the loading-/unloading station, or, as illustrated in FIG. 8, by maintaining the first mold portion 14 engaged with the injection assembly and engaging the first mold portion 14 once the second mold portion 15 is moved to the injection station. By maintaining the first mold portion engaged with the injection assembly, a single first mold portion 14 may be used with multiple second mold portions 15 which are shuttled in and out of the injection station.

The tapered top section 38 of the second mold portion 15 and the tapered mating surface 40 of the first mold portion 14 are configured to self-center themselves with respect to one another, and with respect to the mold core 12 and any mold inserts 42. With this self-centering configuration there is no need to correct any eccentricity which may exist in the mold inserts 42.

Once the first and second mold portions are engaged, and the injection press operates to clamp the apparatus within the press, the nozzle N engages the alignment member 18 for injection of the molding material. The alignment member 18 and interconnected runner assembly 50 are also self-centering, since their vertical movement is permitted within the top mold plate 46 for alignment of the runner plate 66 with the mold core 12 and any mold insert 42. Once the alignment member 18 is engaged with the nozzle, the molding material is injected into the apparatus 10.

Specifically, the molding material pathway flows from the nozzle through the alignment member 18 sprue opening 52, into the center sprue openings 68, 68' of the runner assembly 50, along the runners 70 of the runner plate 66, through the core grooves 72 formed in the mold core 12, and into the mold cavity formed by the external molding surface 90 of the mold core 12, the mold insert 42, the lower insert 86 and the runner plate 66. In the event no mold insert is required, the molded product may be formed using an internal surface of the split ring molding plate 74, 74'.

Once the injection operation is completed at the injection station of the injection press, and the molded product M is sufficiently cured, the apparatus 10 or the second mold portion 15 is unclamped and moved to the unloading station. At the unloading station, first mold portion 14 is removed from the second mold portion 15, if this operation is not previously performed.

Next, the second mold portion 15 is opened from the closed position shown in FIG. 3, to the open position shown in FIG. 5. Movement to the open position is accomplished by movement of the handle 120 and interconnected operating member 36 in the direction of the arrow shown in FIG. 3 to the position in FIG. 5. Sliding movement of the operating member 36 slides the operating pins 109 and bearing members 118 within the passage grooves 110, and moves the links 104 within the triangular recesses 114 from their transverse position shown in FIG. 3, to their position perpendicular to the horizontal central axis H as shown in FIG. 5. Movement of the links 104 as described moves the link pins 106 and the split ring molding plates with which they are engaged, to the open position of FIGS. 5 and 6. In the open position, the molded product M, mold insert 42 and the mold core 12 may be readily removed from the apparatus. Once removal is completed, the second mold portion 15 may be cleaned and reloaded to repeat the injection operation as described.

The process of molding using the present apparatus 10 improves the molding process by reducing the amount of scrap resulting from the process. In the prior art molding processes, greater than 50% of the molding material used was scrap material from runners and sprues. The present molding apparatus reduces the molding material waste to an amount less than 1% of the total material used. The present apparatus also increases the number of parts created per hour from approximately 26 to approximately 60 parts per hour. Additionally, the present apparatus reduces the amount of cycle time, energy used to produce each part, and the amount of labor cost to create the parts. Cycle times are typically approximately 1 minute per part injected. Further improvements in the molding of the part may also be obtained by applying a vacuum to the path of the molding material and mold cavity during injection.

It should be appreciated that the apparatus illustrated in FIG. 8 is adapted to allow unloading and loading steps to be performed on one movable mold platen unit A while the other unit is participating in the injection/curing procedures. Consequently, the apparatus 10 is not idle for any significant length of time during the molding process. The reduction in idle machine time results in increased productivity of both the apparatus 10 and the operator. Additionally, because the unloading/loading positions are offset from the nozzle N and molding or injection position, and are situated at a single shuttle level, the operator may easily and efficiently perform the unloading and loading steps. Furthermore, the movable mold platen units A may be easily initially installed on the shuttle assembly S of the injection press I. Still further, the shuttle assembly S may be held stationary in either the first or second unloading position and the apparatus 10 may be used in a "single" molding process.

In the preferred and illustrated embodiment of FIG. 8, a control system C is additionally, provided, as illustrated in FIG. 8, which is programmable to control all aspects of operation of the supply assembly, extruder assembly, injection assembly, shuttle assembly S, mold pallet assembly A and clamping assembly. The control system includes the main electric power supply (not illustrated) for the apparatus 10. Additionally, the control system, includes an hydraulic unit which actuates the extruder assembly, injection assembly, shuttle assembly, mold pallet assembly and clamping assembly. The hydraulic unit is preferably a conventional closed loop flow and valve system. Pressure and temperature safety switches may also be provided in the apparatus 10 which interface with the control system C.

The control system C includes a conventional programmable computer for programming the predetermined desired settings and operating conditions for operation of the apparatus 10, and a control panel for use by an operator during operation of the apparatus. The computer and a conventional control panel provide programmed or manual instructions for all machine functions, including activations of the various cycles described above. The specific commercial systems listed may be of any one of a number of commercial operator-interface programmable systems. Additionally, operator control panel includes a manual safety switch to enable the operator to shut off the apparatus during any stage of operation.

Based upon the information programmed into the control system C, an automatic cycle can be developed to operate the shuttle assembly S. Alternatively, the operator controls can be used to initiate the machine cycles as may be desired.

The preferred form of the self-centering molding apparatus 10 has been described above. However, with the present disclosure in mind it is believed that obvious alterations to the preferred embodiment, to achieve comparable features and advantages in other assemblies, will become apparent to those of ordinary skill in the art.

We claim:

1. A self-centering molding apparatus comprising,
a first mold portion and a second mold portion together forming a mold cavity for receiving molding material forming a molded product,
said first mold portion having an alignment member in fluid communication with said mold cavity and for alignment and engagement with an injection press for injecting molding material into said apparatus, said first mold portion being adapted for self-centering, mating engagement with said second mold portion,
said second mold portion having a multi-section mold assembly, a support plate and an operating assembly, said mold assembly being adapted for self-centering, mating engagement with said first mold portion, and said operating assembly supported on and engaged with said support plate for opening and closing said multi-section mold assembly for accessing a molded product supported within said mold cavity, and
said support plate is engaged with said operating assembly and said support plate and operating assembly are movable with respect to one another to open said multi-section mold assembly for accessing said molded product within said mold cavity.

2. A self-centering molding apparatus as set forth in claim 1, further including a mold core supported within and forming a part of said mold cavity, wherein said mold core is accessed by opening and closing said multi-section mold assembly, and is removed from said mold cavity together with said molded product.

3. A self-centering molding apparatus as set forth in claim 2, wherein said mold cavity is formed by said alignment member of said first mold portion, said mold core and an internal portion of said multi-section mold assembly.

4. A self-centering molding apparatus as set forth in claim 3, wherein said mold core is secured within said second mold portion during the injection of molding material into said mold cavity, and said mold core may be removed from said mold cavity with a molded product upon completion of the molding operation.

5. A self-centering molding apparatus as set forth in claim 4, wherein said support plate of said second mold portion and said alignment member of said first mold portion include first and second sealing members, respectively, said sealing members for engagement with said mold core upon self-centering engagement between said first and second mold portions.

6. A self-centering molding apparatus as set forth in claim 5, wherein said alignment member of said first mold portion is vertically movable with respect to said second mold portion for centering said alignment member and first mold portion with respect to said second mold portion, and centering said mold core and an injection press to ensure proper injection of molding material into said mold cavity.

7. A self-centering molding apparatus as set forth in claim 6, wherein said support plate of said second mold portion is engaged with an injection press and is movable with respect to the same injection press for alignment with said first mold portion, and said mold core during engagement of the same injection press with the alignment member of the first mold portion for the injection of molding material to the mold cavity.

8. A self-centering molding apparatus as set forth in claim 7, wherein said operating assembly comprises a linkage mechanism interconnected with each section of said multi-section mold assembly.

9. A self-centering molding apparatus as set forth in claim 8, wherein said support plate includes an operating member interconnected with said linkage mechanism, such that movement of said operating member with respect to said second mold portion operates said linkage mechanism to open and close a portion of said multi-section mold assembly.

10. A self-centering molding apparatus as set forth in claim 9, wherein said mold core and insert are centered within said second mold portion multi-section mold assembly when said multi-section mold assembly is closed.

11. A self-centering molding apparatus as set forth in claim 10, wherein said second mold portion multi-section mold assembly includes a tapered top section for mating and centering engagement with a corresponding tapered mating surface on said first mold portion.

12. A self-centering molding apparatus as set forth in claim 11, wherein said mold cavity further includes a mold insert positioned adjacent said mold core and engaged with said first and second sealing members of said first and second mold portions during the injection of molding material into said mold cavity, said mold insert forming a part of said molded product.

13. A self-centering molding apparatus comprising,
a mold core, a first mold portion and a second mold portion together forming a mold cavity for receiving molding material forming a molded product,
said first mold portion having an alignment member in fluid communication with said mold cavity and for alignment and engagement with an injection press for injecting molding material into said apparatus, said first mold portion being adapted for self-centering engagement with said second mold portion and mold core, and mating engagement with said second mold portion,
said second mold portion having a multi-section mold assembly, a support plate and an operating assembly, said mold assembly being adapted for self-centering, mating engagement with said first mold portion, and said operating assembly supported on and engaged with said support plate for opening and closing said multi-section mold assembly for accessing said mold core and a molded product supported within said mold cavity, and
said support plate is engaged with said operating assembly and said support plate and operating assembly are movable with respect to one another to open said multi-section mold assembly for accessing said molded product within said mold cavity.

* * * * *